United States Patent
Yesnik

[11] Patent Number: 5,078,248
[45] Date of Patent: Jan. 7, 1992

[54] CLUTCH AND BRAKE COMPONENTS

[75] Inventor: Marc A. Yesnik, Chicago, Ill.

[73] Assignee: Borg-Warner Automotive Transmission & Engine Components Corporation, Sterling Heights, Mich.

[21] Appl. No.: 638,260

[22] Filed: Jan. 7, 1991

[51] Int. Cl.⁵ .............................................. F16D 27/07
[52] U.S. Cl. .............................. 192/84 C; 192/107 R; 192/107 M; 188/251 M
[58] Field of Search ............ 192/84 C, 107 R, 107 M; 188/251 M

[56] References Cited

U.S. PATENT DOCUMENTS

| | | | |
|---|---|---|---|
| 2,965,205 | 12/1960 | Winchell | 192/66 |
| 3,750,788 | 8/1973 | Heinemann | 192/107 |
| 3,759,353 | 9/1973 | Marin | 192/107 M X |
| 4,160,498 | 7/1979 | Newton et al. | 192/84 C |
| 4,301,906 | 11/1981 | Shirai | 192/84 C |
| 4,529,079 | 7/1985 | Albertson | 192/107 R |
| 4,632,236 | 12/1986 | Koitabashi | 192/84 |
| 4,705,973 | 11/1987 | Koitabash | 310/78 |
| 4,718,303 | 1/1988 | Fogelberg | 74/710.5 |
| 4,727,974 | 3/1988 | Takatoshi | 192/84 |

Primary Examiner—Allan D. Herrmann
Assistant Examiner—Andrea Pitts
Attorney, Agent, or Firm—Willian Brinks Olds et al.

[57] ABSTRACT

Clutch and brake components especially adapted for use in electromagnetic assemblies (50) includes a first disc (56) or plate having a ground surface (58) comprising parallel surface features and a second disc or plate (64) having a turned surface (66) comprising circular or spiral features. Excellent static and dynamic frictional coefficients are achieved. Preferably, the ground (58) and turned (66) surfaces have roughness of between Ra 3 and 300. A wide variety of variously alloyed steels may be utilized to fabricate the clutch or brake components.

20 Claims, 8 Drawing Sheets

CLUTCH AND BRAKE COMPONENTS

BACKGROUND OF THE INVENTION

The invention relates to frictional surfaces for clutches and brakes and more specifically to a surface configuration for opposing brake and clutch components which exhibits improved static and dynamic frictional characteristics.

There is continuing emphasis directed to improving power and torque transmission levels and performance through frictionally engaging clutch and brake components. This is especially true with regard to automotive related products where volume reduction is necessary due to reduced vehicle size and weight reduction is a constant though increasingly difficult goal.

An area of brake and clutch technology receiving particular attention involves those frictionally coupled energy transmitting components associated with electromagnetic clutches. Such clutches are commonly used to couple and decouple air conditioning compressors from an associated drive member and portions of four-wheel drive schemes from one another. Such electromagnetic clutches are called upon to perform high torque transfer and cycle life but are faced with significant space and cost constraints.

Patent art discloses significant activity in this field. For example, U.S. Pat. No. 2,965,205 teaches a high torque capacity clutch or brake for automatic transmissions. The device includes a frustoconical steel ring having a smooth surface which mates with a similarly configured aluminum ring which is first knurled and then coined such that the knurled surface conforms to the surface of the ring.

U.S. Pat. No. 3,750,788 teaches a clutch or brake configuration wherein a wear resistant material includes a contact face formed exclusively of adjacent isosceles triangular teeth in a circular pattern. The teeth deform the opposed friction lining material and create complementary triangular depressions in a circular pattern.

In U.S. Pat. No. 4,632,236, an electromagnetic clutch includes a frictional surface which is machined to a generally trapezoidal shape. The opposing frictional surface is polished and both surfaces are plated.

U.S. Pat. No. 4,705,973 teaches an electromagnetic clutch wherein the rotor and armature plate both contain spiral, concave grooves and projections. At least one of the surfaces of the rotor or armature plate is plated by a metal having a hardness lower than that of the rotor or armature plate.

Finally, in U.S. Pat. No. 4,727,974, another electromagnetic clutch configuration is disclosed in which one of the clutch surfaces includes a plurality of irregularly shaped projections and the other includes machined and plated concave channels and projections arranged in a spiral pattern.

From a review of the foregoing patents and appreciation of the service life and torque requirements of brakes and clutches, it is apparent that improvement in such devices are both possible and desirable.

SUMMARY OF THE INVENTION

Clutch and brake components especially adapted for use in electromagnetic clutch assemblies include a first disc or plate having a ground surface comprising parallel surface features and a second disc or plate having a ground surface comprising circular or spiral features. Excellent static and dynamic frictional coefficients are achieved. Preferably, the ground and turned surfaces have roughness of between Ra 3 and 300. The clutch components may be fabricated of a wide variety of variously alloyed steels.

It is thus an object of the present invention to provide clutch and brake surfaces which provide good service life and high torque transfer capabilities.

It is a still further object of the present invention to provide rotor and armature components for an electromagnetic clutch, one of which includes circular or spiral turned grooves and ridges and the other which includes parallel ground grooves and ridges.

It is a still further object of the present invention to provide a configuration for clutch and brake component surfaces which is interchangeable and readily produced.

Further objects and advantages of the present invention will become apparent by reference to the following description and appended drawings.

DESCRIPTION OF THE PREFERRED EMBODIMENT

Figure 1:
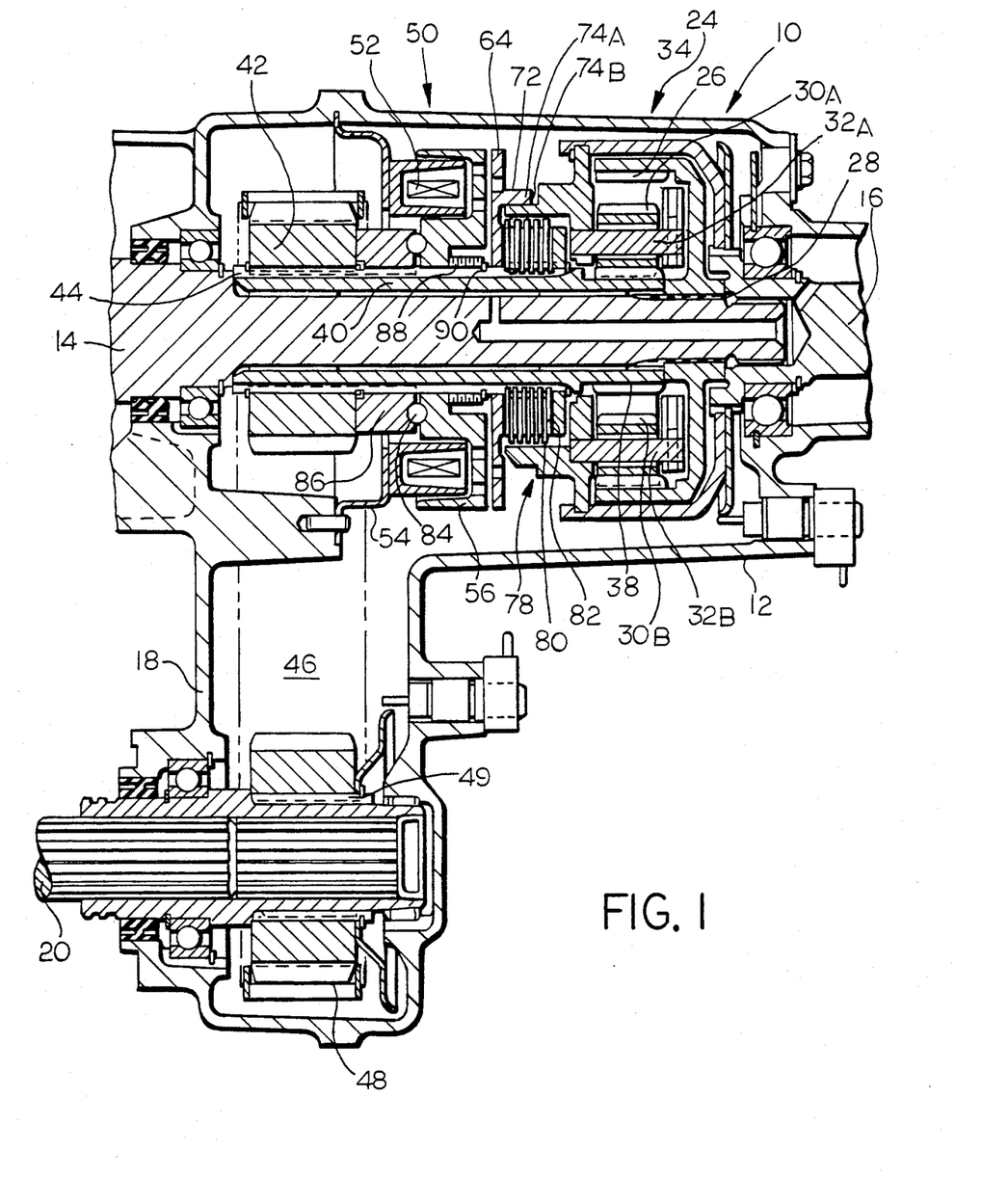
FIG. 1 is a full, sectional view of a portion of a four-wheel drive vehicle transfer case which incorporates the present invention.

Referring now to FIG. 1, an in-line vehicular clutch assembly incorporating the present invention is illustrated and generally designated by the reference numeral 10. The clutch assembly 10 illustrated is intended for use in the drive train of four-wheel drive vehicles to selectively provide power to the front wheels of said vehicle.

The clutch assembly 10 includes a housing 12 rotatably supporting an input drive shaft 14 at one end and rotatably supporting a first output drive shaft 16 at its opposite end. The housing 12 includes a radially outwardly extending lobe 18 which rotatably supports a second output drive shaft 20.

Disposed within the housing 12 is a planetary gear assembly 24. The planetary gear assembly 24 includes three sets of concentric and co-acting, relatively rotatable components. First of all, an internally toothed ring gear 26 is operably coupled through sets of interengaging splines 28 to the input drive shaft 14 and rotates therewith. Meshing with the ring gear 26 are pairs of pinion or planet gears 30A and 30B, one of each pair being illustrated in FIG. 1. The pairs of planet gears 30A and 30B are rotatably disposed upon corresponding pairs of suitable stub shafts 32A and 32B which are in turn secured within a planet carrier 34. The planet gears 30A and 30B constitute two gear trains, the outer planet gear 30B of each train meshing with the ring gear 26 and the inner planet gear 30A of each gear train meshing with a sun gear 38 which is coupled to or integrally formed with a sleeve shaft 40. The sleeve shaft 40 is disposed concentrically about and rotates independently of the input drive shaft 14. At the opposite end of the sleeve shaft 40, a first gear or chain drive sprocket 42 is coupled thereto by interengaging splines 44. The first chain drive sprocket 42 receives and drives a chain 46 or other similar and suitable power transfer means which engages a second gear or chain drive sprocket 48 coupled by interengaging splines 49 to the second output drive shaft 20. As will be readily appreciated, rotary motion of the input drive shaft 14 effects rotary motion of the output drive shaft 16, the sleeve shaft 40, the planet carrier 34 and the output drive shaft 16 in predetermined ratios. Depending on the torque transfer characteristics desired, any one of the three gear sets of the planetary gear mechanism 24 may be coupled to the input shaft 14.

Also disposed within the housing 12 is an electromagnetic clutch assembly 50. The electromagnetic clutch assembly 50 includes a stationary magnetic coil 52 mounted upon a formed mounting plate 54 which is received within and secured to the housing 12 by suitable means. Adjacent the coil 52 and concentrically disposed about the sleeve shaft 40 is a clutch rotor 56. Spaced from the rotor 56 and arranged in aligned opposition therewith is an armature 64.

Figure 2:
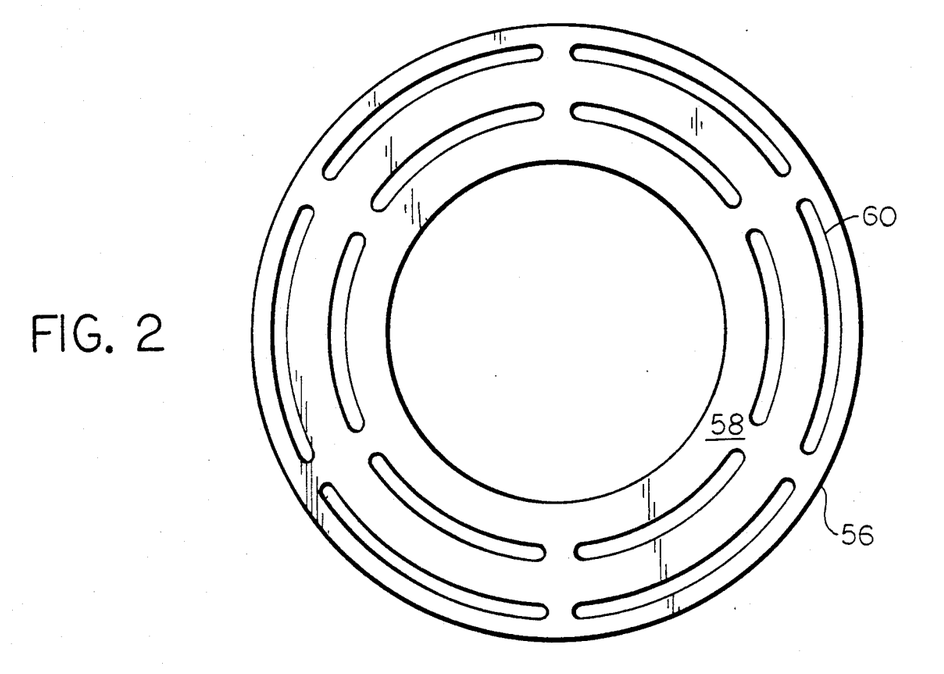
FIG. 2 is a plan view of the rotor face of an electromagnetic clutch assembly incorporating the present invention.

As illustrated in FIG. 2, the rotor 56 includes a clutch or brake surface or facing 58 and defines a plurality of spaced apart, circumferentially extending slots 60.

Figure 3:
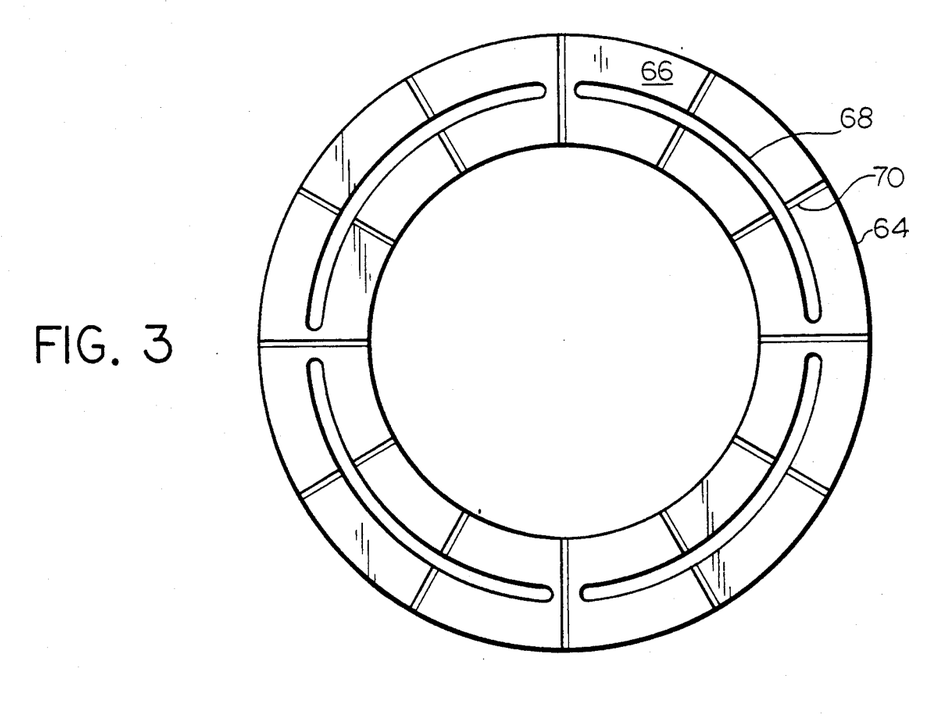
FIG. 3 is a plan view of an armature face of an electromagnetic clutch incorporating the present invention.

As illustrated in FIG. 3, the armature 64 defines a clutch or brake surface or facing 66 which opposes and selectively contacts the surface 58 of the rotor 56 and further defines a plurality of spaced apart circumferentially extending slots 68. The single interrupted circle of the slots 68 is preferably disposed at a radial location midway between the two circles of slots 60 in the rotor 56 as illustrated in FIG. 1. The surface 66 of the armature 64 defines a plurality of radially extending channels or grooves 70.

Turning again to FIG. 1, the armature 64 also includes an axially extending annulus 72 which is coupled to the planet carrier 34 by opposed interengaging sets of teeth 74A and 74B. A disc pack clutch assembly 78 operable disposed between the planet carrier 34 and the sleeve shaft 40 includes a first plurality of clutch plates 80 coupled by suitable splines to the planet carrier 34 and a second plurality of interleaved clutch plates 82 coupled to the sleeve shaft 40. A plurality of movable locking balls 84 are disposed between the rotor 56 and a connecting sleeve 86. The movable locking balls 84 are disposed in a like plurality of pairs of conically shaped recesses having ramps on the opposed faces of the rotor 56 and a connecting sleeve 86. Finally, the clutch assembly 50 includes a plurality of compression springs 88 operably disposed between the rotor 56 and a retaining ring 90 coupled to the sleeve shaft 40. The compression springs 88 bias the rotor 56 away from the armature 64.

When the electromagnetic clutch assembly 50 is de-energized, no direct connection exists between the first and second output shafts 16 and 20. The torque delivered to each of the output shafts 16 and 20 is determined by the configuration and coupling of the planetary gear set 24. Application of current to the coil 52 of the electromagnetic clutch assembly 50 creates a magnetic flux which causes the armature 64 to translate toward the rotor 56 thereby initiating a frictional driving connection between the rotor 56 and the armature 64. Because the armature 64 is coupled to the first output drive shaft 16, it will rotate at the same speed. Likewise, because the rotor 56 is coupled to the second output shaft 20 through the drive chain 46, it will rotate at the same speed as the second output drive shaft 20. Therefore, if relative motion exists between the power output shafts 16 and 20, such motion will cause the balls 84 to roll up the conically shaped recesses and forcibly move the rotor 56 and the armature 64 to compress the friction plates 80 and 82 of the disc pack clutch assembly 78. When compressed, the plates 80 and 82 transmit energy between the output shafts 16 and 20, adding torque to the slower turning shaft and subtracting torque from the faster turning shaft. By modulating the current to the coil 52 of the electromagnetic clutch assembly 50, the relative rotation of the output shafts 16 and 20 may be controlled.

The clutch assembly 10 just described and its operation are more fully described in co-owned U. S. Pat. No. 4,718,303 which is hereby incorporated by reference.

Figure 4:
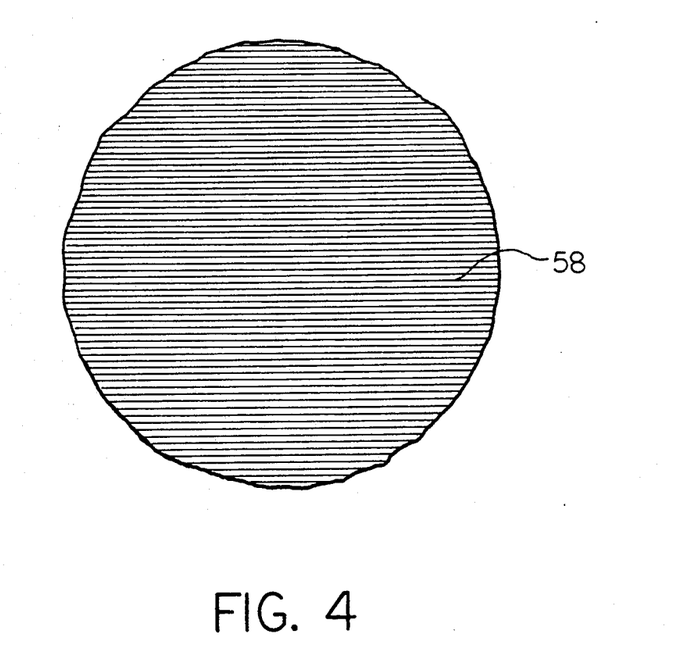
FIG. 4 is an enlarged view of the surface finish of the rotor face or coil housing illustrating the ground, i.e., straight line, finish pattern.

Turning now to FIGS. 2 and 4, the rotor 56 and the greatly magnified surface 58 of the rotor 56 are shown, respectively. The rotor surface 58 is ground such that a plurality of parallel grind marks, i.e., surface irregularities 96, are generally parallel and define generally parallel ridges and valleys on the surface 58 of the rotor 56. Grinding is the preferable method of producing this finish of the surface 58 though other machining techniques which effect a pattern of substantially parallel ridges and valleys may be utilized. The surface roughness may be in the range of from Ra 3 through 300 and is preferably between Ra 6 and 200.

Figure 5:
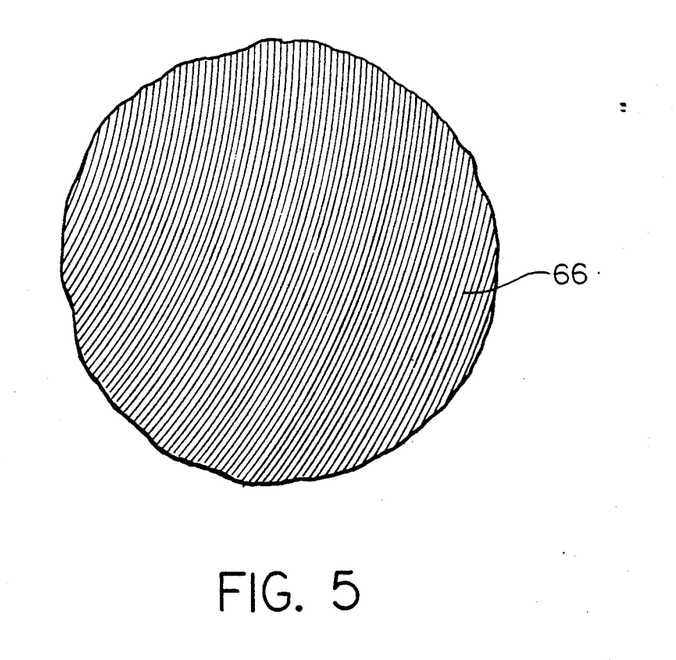
FIG. 5 is an enlarged view of the surface finish of an armature of an electromagnetic clutch according to the present invention having a turned circular or spiral pattern.

Referring to FIGS. 3 and 5, the surface 66 of the armature 64 defines a similar surface finish Here, however, the surface scratches or irregularities 98 are arranged in a circular or spiral pattern. Such surface finish is preferably achieved by turning though other machining techniques which produce a pattern of generally circular or spiral closely adjacent ridges and valleys are totally suitable. Again, the surface roughness may be in the range of Ra 3 through 300, a preferable range being Ra 6 to 200.

It should be clearly understood that the described and illustrated arrangement of surface treatments on specific components is exemplary and illustrative only. Either the rotor 56 or the armature 64 may include the parallel (ground) surface 58 while the other may include the circular or spiral (turned) surface 66 or vice versa. In other words, the invention resides in the combination of the surface treatments and associated clutch componentry, not the specific arrangement of surface treatments on specific components. As those familiar with such apparatus will readily appreciate, the present invention may be incorporated into and utilized with a broad range of clutch as well as brake assemblies wherein it is desirable to achieve significant energy transmission and braking capability in relatively compact components. If the device is to be utilized as a brake, one of the two rotatable members, either the rotor 56 or the armature 64, is reconfigured as a stationary component such that when the electromagnetic clutch assembly 50 is activated, the frictional surfaces 58 and 66 engage and inhibit rotation of the other component.

Several examples of the performance of clutch and brake components incorporating this treatment on the clutch or faces are set forth below. At the outset, it should be noted that the precise mechanism of improved clutch performance achieved through the utilization of opposed clutch faces having parallel and circular or spiral surface treatment is not fully understood. It is believed, however, that the constantly changing relationship between the opposed ground and turned marks, collectively referred to as the surface irregularities 96 and 98, which alternates between perpendicularity, parallelism and back to perpendicularity twice per revolution provides a constant pumping and redistributing energy to the clutch fluid thereby ensuring uniform fluid distribution and enhancing clutch and brake performance.

In order to confirm the benefits and performance of the present invention, four different combinations of clutch face surface treatments were tested at several different operating temperatures. Due to the time and expense attendant a full scale testing program, it was determined to perform such tests on a low velocity friction apparatus (LVFA). The low velocity friction apparatus has been used extensively for the study of automatic transmission clutch and fluid characteristics because the results obtained through such tests have been found to correlate well with the performance of such materials in actual transmission service. A low velocity friction apparatus in which the data presented in FIGS. 7 through 10 was gathered is illustrated in FIG. 6.

Figure 6:
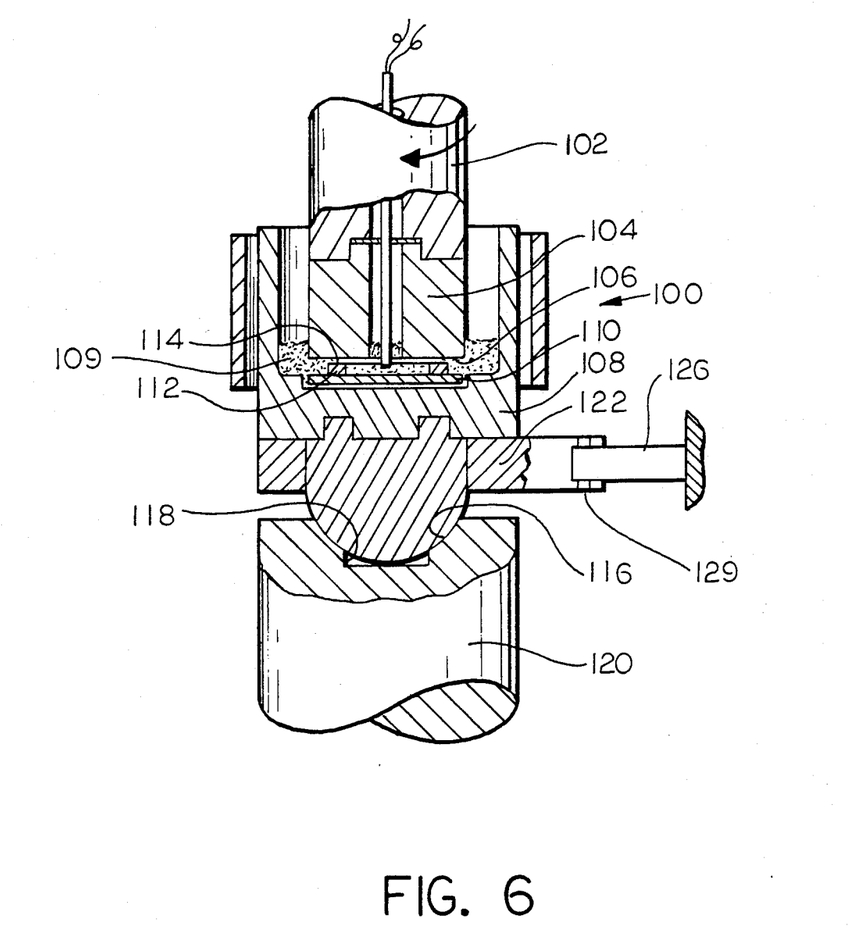
FIG. 6 is a side, elevational view with portions broken away of a low velocity friction apparatus on which the data of FIGS. 7 through 10 were developed.

Referring now to FIG. 6, a low velocity friction apparatus 100 is illustrated and includes a shaft 102 which is driven by a variable speed apparatus (not illustrated) capable of sweeping from 0 R.P.M. up to a maximum selected rotational speed and back to 0 R.P.M. At the end of the shaft 102 is a demountable cap 104 of one of the clutch materials under test having a terminal surface 106 which may be finished a desired to duplicate the clutch surface to be tested. The shaft 102 and cap 104 are generally received within a cup 108. The cup 108 receives a sample plate 110 having an annulus 112 of the second material under test which likewise defines a face 114 opposite the face 106 of the cap 104. The cup 108 receives a small charge of a typical friction clutch lubricant 109 such as automatic transmission fluid or other similar representative clutch lubricant.

The cup 108 is supported upon a hemispherical bearing 116 which is in return received in a complementally configured blind opening 118 of a support piston 120. The piston 120 is supported by an air bearing to minimize external, particularly lateral, forces and friction. The cup 108 also includes a radial torque arm 122 which is terminated in a tangential knife edge 124. The knife edge 124 abuts and contacts a strain gauge 126 or similar transducer which senses the force transmitted through the interface between the surfaces 106 and 114 and drives suitable display and recording instrumentation (not illustrated).

The following Figures represent the performance of various materials utilized for the surface 106 of the demountable cap 104 and the surface 114 of the annulus 112. The coefficient of dynamic friction is presented as the Y axis or ordinate distance. The X axis or abscissa presents the speed in meters per second which is the nominal linear speed of the frictional interface at an average radius of the annulus 112. The result plotted is an average of a first accelerating speed sweep beginning at 0 R.P.M. and increasing to the maximum plotted speed of 0.5 meters per second and a second decelerating speed sweep back to 0 R.P.M. over a span of approximately 20 seconds. Several traces are presented in each Figure which represent the performance under the stated temperature condition.

Figure 7:
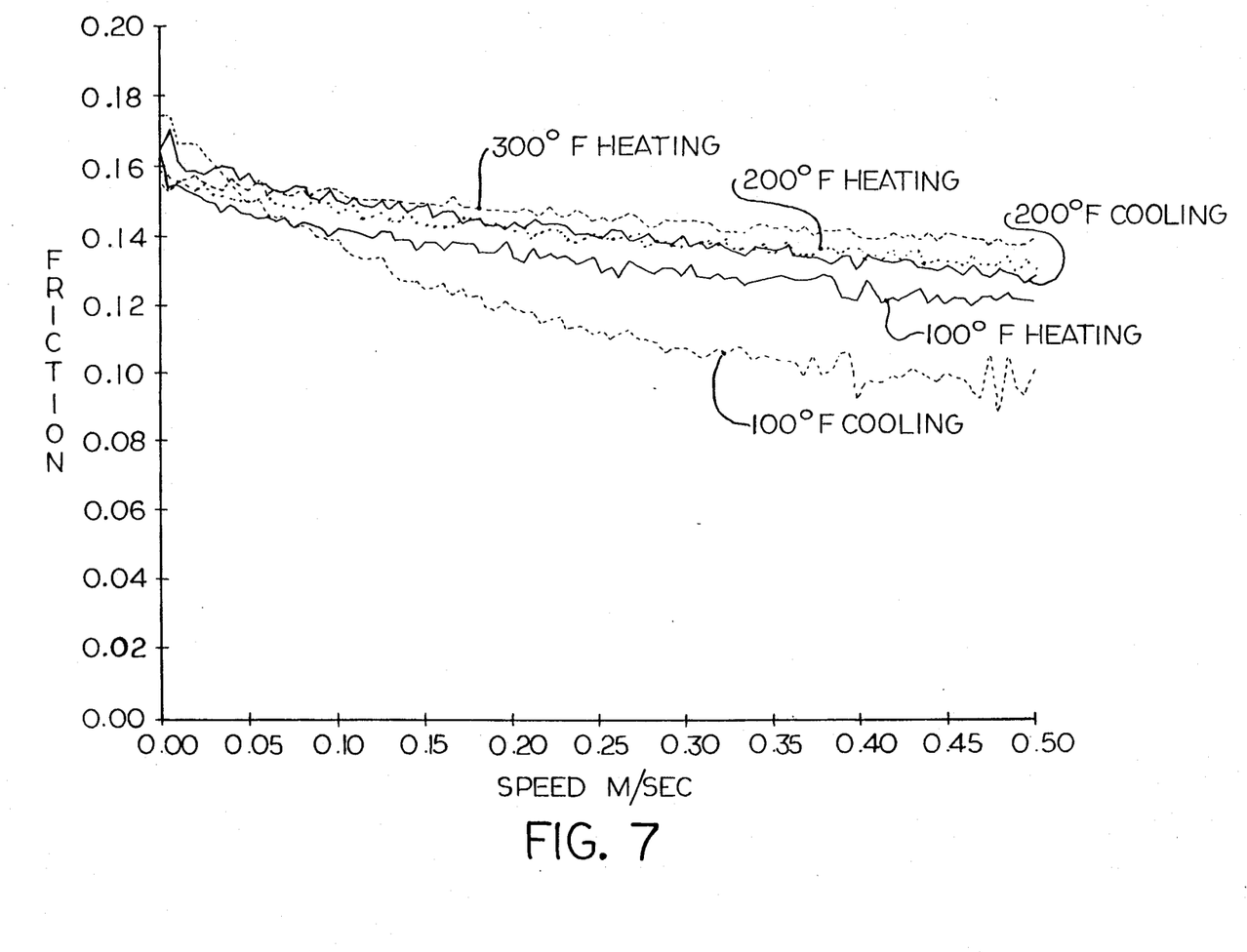
FIG. 7 is a graph showing the performance of a clutch having one ground and one turned surface according to the present invention achieved in a low velocity friction test apparatus of FIG. 6.

Turning now to FIG. 7, the five traces presented show the test results obtained by the foregoing test procedure with one surface that is either the surface 106 or the surface 114 of 1018 steel ground to a surface roughness of Ra 30 and the other surface of 1117 turned steel. For such surface treatments, the coefficient of dynamic friction is about 0.121.

Figure 8:
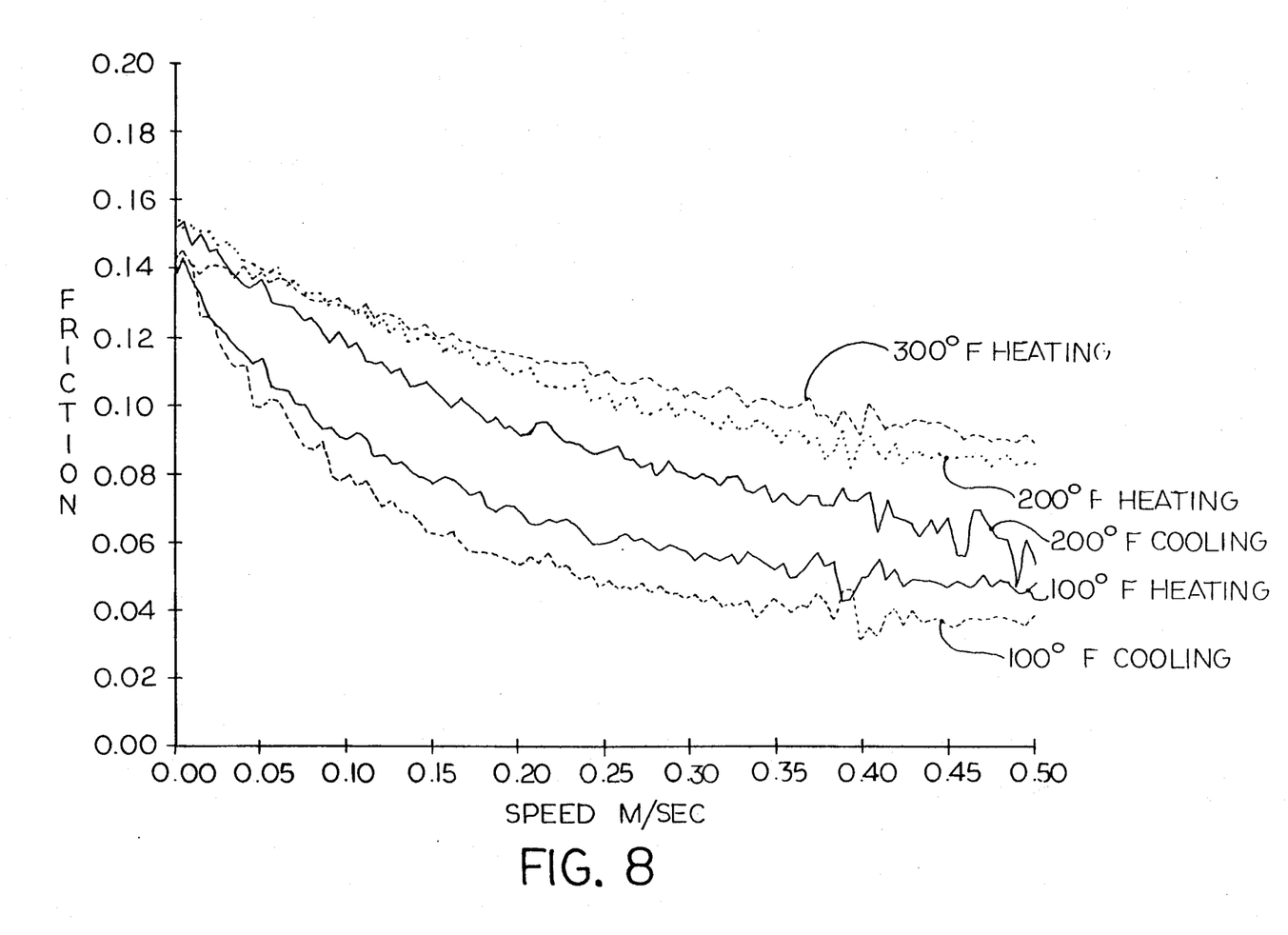
FIG. 8 is a graph showing the performance of a clutch having two ground surfaces achieved in a low velocity friction test apparatus of FIG. 6.

Turning to FIG. 8, the clutch surface treatments are a first surface of 1117 steel ground to a surface roughness of Ra 16 and a 1018 steel plate also having a ground surface. This combination of surface treatment results in a coefficient of dynamic friction of approximately 0.074.

Figure 9:
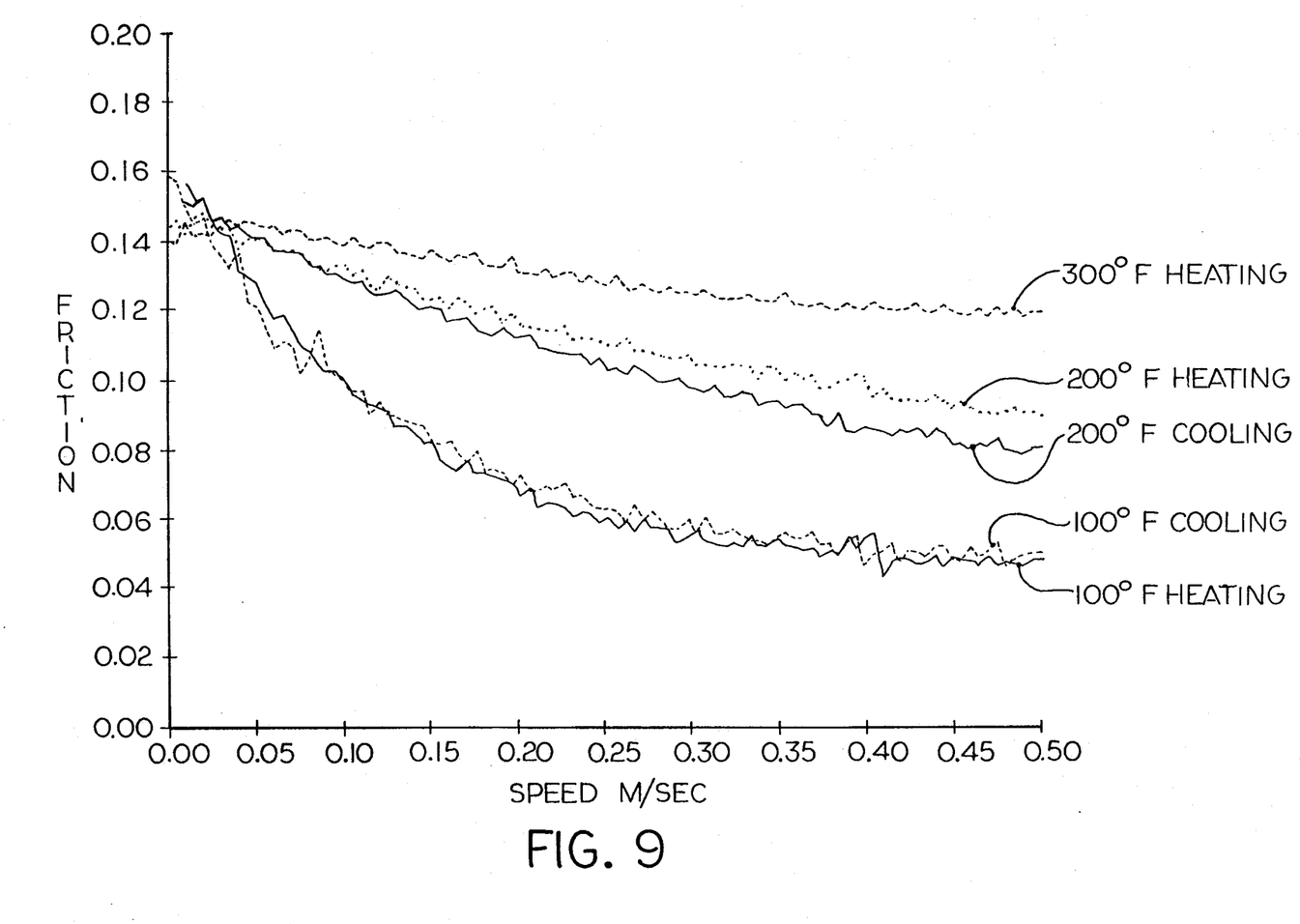
FIG. 9 is a graph showing the performance of a clutch having one turned and one tumbled surface achieved in a low velocity friction test apparatus of FIG. 6.
Figure 10:
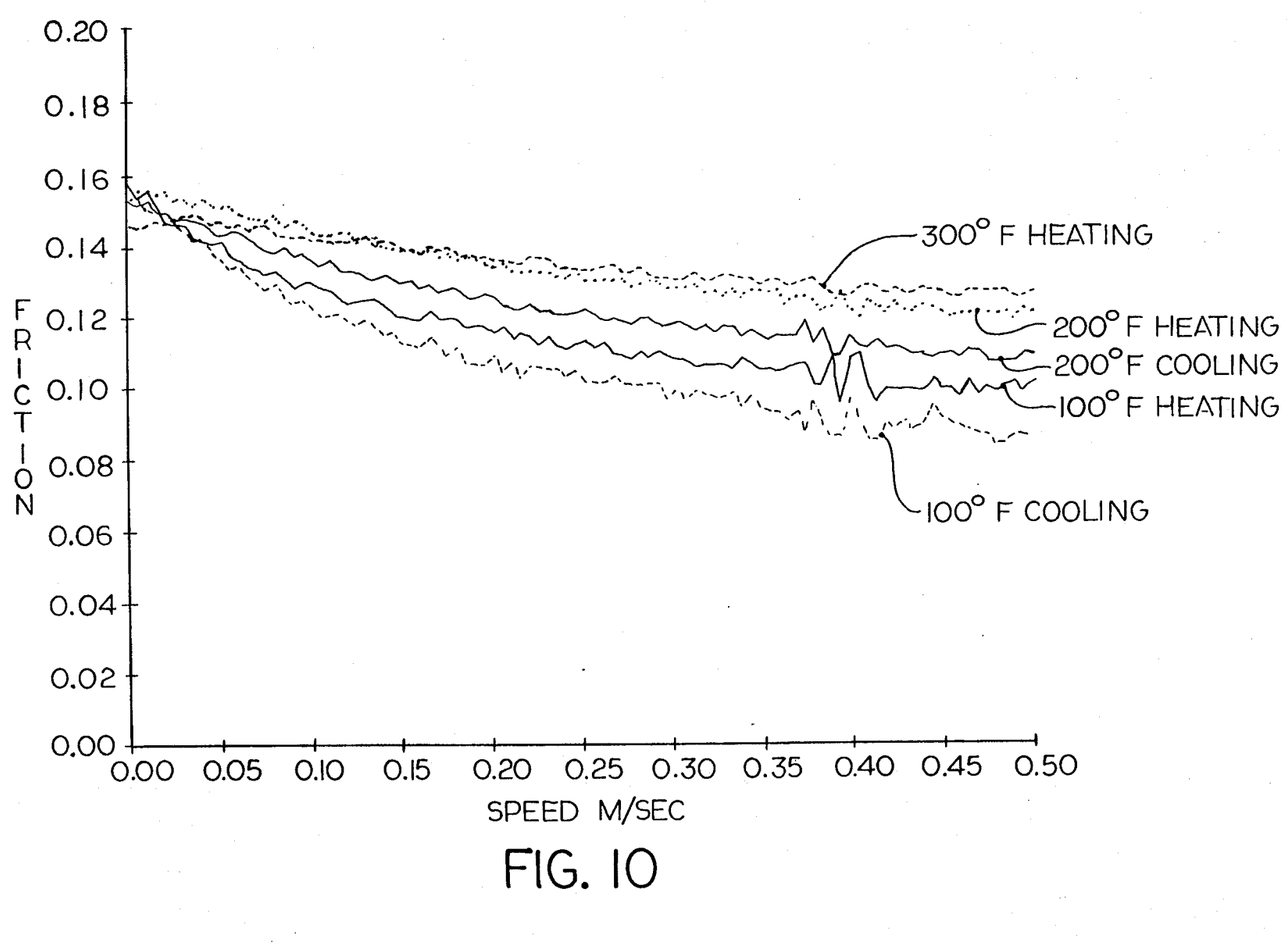
FIG. 10 is a graph showing the performance of a clutch having one ground and one turned surface according to the present invention achieved in a low velocity friction test apparatus of FIG. 6.

In FIG. 9, a 1117 steel face has been turned with a roughness of Ra 30 and is engaged against a 1035 tumbled steel plate. Finally in FIG. 10, a 1117 steel clutch surface, turned to have a surface roughness of about Ra 30, engages a 1035 ground steel surface. This combination produces a coefficient of dynamic friction of approximately 0.117.

It should be appreciated that the foregoing test results are representative of performance of various clutch surface treatment combinations. They clearly show the improved coefficient of dynamic friction achieved with opposing ground and turned surfaces, presented in FIGS. 7 and 10, relative to other combinations of clutch surface treatments illustrated in FIGS. 8 and 9. Once again, it should be understood that the specific disposition of the ground or turned surface on either the rotor or armature, or other clutch components, is per se of no consequence. That is, it is the combination of ground and turned surfaces not the specific components that carry them that is significant. The invention thus resides in clutch or brake components where one of the surfaces is turned to have concentric or spherical surface treatment interruptions or irregularities whereas the opposing clutch component is ground such that its surface defines parallel surface interruptions or irregularities.

The foregoing disclosure is the best mode devised by the inventor for practicing this invention. It is apparent, however, that apparatus incorporating modifications and variations will be obvious to one skilled in the art of clutches and brakes. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. In an electromagnetic clutch assembly (50) having an electromagnetic coil (52), an armature (64) disposed about an axis and defining a first friction surface (66) and a rotor (56) disposed about said axis and defining a second friction surface (58) opposing said first friction surface (66), the improvement comprising first surface treatment irregularities (96) on one of said frictional surfaces (66, 58) arranged generally in parallel, and second surface treatment irregularities (98) on the other of said frictional surfaces (58, 66) arranged generally circularly.

2. The improvement of claim 1 wherein said first surface treatment irregularities (96) are achieved by grinding.

3. The improvement of claim 1 wherein said second surface treatment irregularities (98) are achieved by turning.

4. The improvement of claim 1 wherein said first and second surface treatment irregularities (96, 98) have a roughness of from between Ra 3 to 300.

5. The improvement of claim 1 wherein said armature (64) and said rotor (56) are steel.

6. The improvement of claim 1 further including a plurality of spaced-apart curved slots (60, 68) disposed in said armature (64) and said rotor (56).

7. A friction brake or clutch comprising, in combination,
a first member (56, 64) disposed about an axis and having a first friction surface (58, 66) disposed perpendicularly to said axis,
a second member (64, 56) disposed about said axis and having a second friction surface (66, 58) disposed perpendicularly to said axis and in opposition to said first friction surface (58, 66), and
means (50) for selectively translating at least one of said surfaces (58, 66) into contact with the other of said surfaces (66, 58),
one of said first and said second surfaces (58, 66) having roughness characterized by parallel irregularities (96),
the other of said first and second surfaces (66, 58) having roughness characterized by generally circular irregularities (98).

8. The clutch or brake of claim 7 wherein said parallel irregularities (96) are the result of grinding.

9. The clutch or brake of claim 7 wherein said generally circular irregularities (98) are the result of turning.

10. The clutch or brake of claim 7 wherein said irregularities (96, 98) have surface roughness between Ra 3 and 300.

11. The clutch or brake of claim 7 wherein said means (50) for selectively translating includes an electromagnetic coil (52) and one of said first and second members (56, 64) is a rotor (56) and the other of said first and second members (64, 56) is an armature (64).

12. The clutch or brake of claim 7 wherein said first and said second members (56, 64) define a plurality of spaced-apart curved slots (60, 68) disposed about said axis.

13. The clutch or brake of claim 7 wherein one of said surfaces (58, 66) includes a plurality of radially oriented grooves (70).

14. A selectively activated energy transfer device comprising, in combination,
a first member (56, 64) disposed for rotation about an axis and having a first friction surface (58, 66) disposed perpendicularly to said axis,
a second member (64, 56) having a second friction surface (66, 58) disposed in opposition to said first friction surface (58, 66),
means (50) for selectively translating one of said first and said second members (56, 64) and said respective surface (58, 66) into contact with the other of said members (64, 56) and its respective surface (66, 58),
one of said first and said second surfaces (58, 66) having roughness characterized by parallel irregularities (96),
the other of said first and second surfaces (66, 58) having roughness characterized by generally circular irregularities (98).

15. The device of claim 14 wherein said second member (64, 56) is fixed and said device functions as a brake.

16. The device of claim 14 wherein said second member (64, 56) rotates about said axis and said device functions as a clutch.

17. The device of claim 14 wherein said selectively translating means includes an electromagnetic coil (52).

18. The device of claim 14 wherein said parallel irregularities (96) are produced by grinding and have a roughness of between Ra 3 and 300.

19. The device of claim 14 wherein said generally circular irregularities (98) are produced by turning and have a roughness of between Ra 3 and 300.

20. The device of claim 14 wherein said first member is a disc (56) and said second member is a plate (64).

* * * * *